United States Patent [19]
Le-Khac et al.

[11] Patent Number: 6,013,596
[45] Date of Patent: Jan. 11, 2000

[54] DOUBLE METAL CYANIDE CATALYSTS CONTAINING CYCLIC, BIDENTATE COMPLEXING AGENTS

[75] Inventors: Bi Le-Khac, West Chester; Wei Wang, Upper Darby; Mahmoud K. Faraj, Newtown Square, all of Pa.

[73] Assignee: ARCO Chemical Technology, L.P., Greenville, Del.

[21] Appl. No.: 09/080,780

[22] Filed: May 18, 1998

[51] Int. Cl.[7] .............................. B01J 27/26; B01J 31/00; C08G 65/04; C08G 59/68; C08G 65/32

[52] U.S. Cl. ........................... 502/175; 502/172; 502/159; 502/154; 525/403; 528/405; 528/415

[58] Field of Search ...................... 502/159, 172, 502/175; 525/403; 528/405, 415

[56] References Cited

U.S. PATENT DOCUMENTS

| | | | |
|---|---|---|---|
| 3,278,457 | 10/1966 | Milgrom | 260/2 |
| 3,278,458 | 10/1966 | Belner | 260/2 |
| 3,404,109 | 10/1968 | Milgrom | 260/611 |
| 3,427,256 | 2/1969 | Milgrom | 252/431 |
| 3,442,876 | 5/1969 | Herold | 260/80.3 |
| 3,538,043 | 11/1970 | Herold | 260/40 |
| 3,829,505 | 8/1974 | Herold | 260/611 |
| 3,900,518 | 8/1975 | Milgrom | 260/573 |
| 3,941,849 | 3/1976 | Herold | 260/607 |
| 4,472,560 | 9/1984 | Kuyper | 526/120 |
| 4,477,589 | 10/1984 | van der Hulst | 502/169 |
| 5,145,883 | 9/1992 | Saito et al. | 521/172 |
| 5,158,922 | 10/1992 | Hinney et al. | 502/175 |
| 5,223,583 | 6/1993 | Higuchi et al. | 525/404 |
| 5,470,813 | 11/1995 | Le-Khac | 502/175 |
| 5,482,908 | 1/1996 | Le-Khac | 502/156 |
| 5,545,601 | 8/1996 | Le-Khac | 502/156 |
| 5,714,428 | 2/1998 | Le-Khac | 502/159 |

FOREIGN PATENT DOCUMENTS

| 3-128930 | 5/1991 | Japan . |
|---|---|---|

OTHER PUBLICATIONS

J.L. Schuchardt et al., "Preparation of High Molecular Weight Polyols Using Double Metal Cyanide Catalysts", 32 Annual Polyurethane Technical Marketing Conference, Oct. 1–4, 1989, pp. 360–364.

*Primary Examiner*—Mark L. Bell
*Assistant Examiner*—J. Pasterczyk
*Attorney, Agent, or Firm*—Jonathan L. Schuchardt

[57] ABSTRACT

Double metal cyanide (DMC) catalysts and methods for making them are disclosed. The catalysts comprise a DMC compound, an organic complexing agent, and optionally, a functionalized polymer. The key component is the complexing agent, which comprises a $C_3$–$C_5$ aliphatic alcohol a cyclic, bidentate compound selected from lactams and lactones. Polyether polyols made from the catalysts contain reduced levels of high-molecular-weight (Mn greater than 400,000) components and consistently perform better in urethane applications such as flexible and molded foams.

21 Claims, No Drawings

DOUBLE METAL CYANIDE CATALYSTS CONTAINING CYCLIC, BIDENTATE COMPLEXING AGENTS

FIELD OF THE INVENTION

The invention relates to double metal cyanide (DMC) catalysts and methods for making them. In particular, the invention relates to DMC catalysts useful for making polyether polyols that contain reduced levels of a high-molecular-weight component compared with polyols made using other known DMC catalysts.

BACKGROUND OF THE INVENTION

Double metal cyanide complexes are well-known catalysts for epoxide polymerization. These active catalysts give polyether polyols that have low unsaturation compared with similar polyols made using basic (KOH) catalysis. The catalysts can be used to make many polymer products, including polyether, polyester, and polyetherester polyols. These polyols are useful in polyurethane coatings, elastomers, sealants, foams, and adhesives.

DMC catalysts are usually made by reacting aqueous solutions of metal salts and metal cyanide salts to form a precipitate of the DMC compound. A water-soluble, low-molecular-weight organic complexing agent, typically an ether or an alcohol, is included in the catalyst preparation. The organic complexing agent is needed for favorable catalyst activity. Preparation of typical DMC catalysts is described, for example, in U.S. Pat. Nos. 3,427,256, 3,289,505, and 5,158,922.

While water-soluble ethers (e.g., dimethoxyethane ("glyme") or diglyme) and alcohols (e.g., isopropyl alcohol or tert-butyl alcohol) are most commonly used as the organic complexing agent, many other general classes of compounds have been described. For example, U.S. Pat. No. 4,477,589 teaches (column 3, lines 20–22) that the organic complexing agent can be "an alcohol, aldehyde, ketone, ether, ester, amide, nitrile, or sulphide." Others list the same classes (see, e.g., U.S. Pat. No. 3,278,458 at column 6 and U.S. Pat. No. 3,941,849 at column 13). According to U.S. Pat. No. 3,278,458, the organic complexing agent preferably has "a substantially straight chain" or is "free of bulky groups." U.S. Pat. Nos. 5,158,922 (column 6) and 5,470,813 (column 5) add nitriles and ureas to the list of suitable complexing agents. Japanese Pat. Appl. Kokai No. H3-128930 (Morimoto et al.) teaches to use N,N-dialkylamides (e.g., N,N-dimethylacetamide) as the organic complexing agent to make catalysts with improved activity.

For decades, DMC catalysts having a relatively high degree of crystallinity were used for making epoxide polymers. The most popular catalyst contained an organic complexing agent (usually glyme), water, excess metal salt (typically zinc chloride), and the DMC compound. Activity for epoxide polymerization, which exceeded the activity available from the commerical standard (KOH), was thought to be adequate. Later, it was appreciated that more active catalysts would be valuable for successful commercialization of polyols from DMC catalysts.

Recent improvements in DMC catalyst technology have provided catalysts with exceptional activity for epoxide polymerization. For example, U.S. Pat. No. 5,470,813 describes substantially amorphous or non-crystalline catalysts that have much higher activities compared with earlier DMC catalysts. Other highly active DMC catalysts include, in addition to a low molecular weight organic complexing agent, a functionalized polymer such as a polyether (see U.S. Pat. Nos. 5,482,908 and 5,545,601) or other functional group-containing polymer (U.S. Pat. No. 5,714,428). Highly active DMC catalysts are generally substantially non-crystalline, as is evidenced by powder X-ray diffraction patterns that lack many sharp lines. The catalysts are active enough to allow their use at very low concentrations, often low enough to overcome any need to remove the catalyst from the polyol.

Even the best DMC catalysts known could be improved. High catalyst activity has sometimes come at a price, namely the unexpected formation of traces of polyether having extremely high (greater than 400,000 or >400K) number average molecular weight (Mn). This high-molecular-weight component, even at part-per-million levels, can negatively impact the way polyether polyols made from the catalysts perform in urethane applications such as flexible or molded polyurethane foams. For example, polyols that contain too much high-molecular-weight component can process poorly, give tight foams, or cause foam settling or collapse. While various approaches have been proposed for dealing with the high-molecular-weight component (e.g., reformulation of the urethane, removal of the component from the rest of the polyol after formation), an ideal strategy would begin with the catalyst and minimize or eliminate formation of the component.

In sum, improved DMC catalysts are still needed. A preferred catalyst would have high activity similar to that of the substantially non-crystalline DMC catalysts now known (e.g., from U.S. Pat. Nos. 5,470,813 or 5,482,908). A preferred catalyst would still give polyol products with low viscosities and low unsaturation. Ideally, however, the catalyst would not produce significant amounts of high-molecular-weight polyol components, particularly those having number average molecular weights greater than about 400,000.

SUMMARY OF THE INVENTION

The invention provides a way to make polyether polyols that perform more consistently in urethane applications. The invention is a double metal cyanide (DMC) catalyst and a method for making it. The catalyst comprises a DMC compound, an organic complexing agent, and optionally, from about 2 to about 80 wt. % of a functionalized polymer. The key component is the organic complexing agent. It comprises a $C_3$–$C_5$ aliphatic alcohol and from about 5 to about 95 mole percent, based on the total amount of organic complexing agent, of a cyclic, bidentate compound selected from lactams and lactones. The invention also includes a process for making an epoxide polymer using the catalysts.

We surprisingly found that making DMC catalysts with a complexing agent comprising a mixture of a $C_3$–$C_5$ aliphatic alcohol and a cyclic, bidentate compound selected from lactams and lactones offers valuable and unexpected benefits. In particular, polyether polyols made from the catalysts contain reduced levels of high-molecular-weight (Mn greater than 400,000) components. This reduction makes the polyols process better in urethane applications such as flexible and molded foams.

DETAILED DESCRIPTION OF THE INVENTION

Catalysts of the invention comprise a double metal cyanide (DMC) compound, an organic complexing agent mixture, and optionally, a functionalized polymer.

Double metal cyanide compounds useful in the invention are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Suitable metal salts include, for example, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel(II) nitrate, and the like, and mixtures thereof. Zinc halides are preferred.

The water-soluble metal cyanide salts used to make the double metal cyanide compounds useful in the invention preferably have the general formula $(Mu)_a M'(CN)_b (A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Mu is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, for example, potassium hexacyanocobaltate(III), potassium hexacyanoferrate(II), potassium hexacyanoferrate(III), calcium hexacyanocobaltate(III), lithium hexacyanoiridate(III), and the like.

Examples of double metal cyanide compounds that can be used in the invention include, for example, zinc hexacyanocobaltate(III), zinc hexacyanoferrate(III), zinc hexacyanoferrate(II), nickel(II) hexacyanoferrate(II), cobalt (II) hexacyanocobaltate(III), and the like. Further examples of suitable double metal cyanide compounds are listed in U.S. Pat. No. 5,158,922, the teachings of which are incorporated herein by reference. Zinc hexacyanocobaltates are preferred.

The catalysts of the invention include an organic complexing agent comprising an alcohol and a cyclic, bidentate compound. The alcohol is a $C_3-C_5$ aliphatic alcohol. Suitable alcohols include, for example, n-propyl alcohol, isopropyl alcohol, isobutyl alcohol, tert-butyl alcohol, tert-amyl alcohol, and the like, and mixtures thereof. Branched alcohols are preferred; tert-butyl alcohol is particularly preferred.

In addition to the alcohol, the complexing agent includes a cyclic, bidentate compound selected from the group consisting of lactams and lactones. Preferably, the lactam or lactone is at least partially soluble in water. Especially preferred are $C_3-C_6$ lactams and lactones.

Lactams are cyclic amides. Many are conveniently produced by dehydrating common amino acids. The lactams can be substituted on the ring carbons or on the nitrogen atom with one or more alkyl, hydroxyalkyl, hydroxy, halogen, or alkoxy groups, or the like. Suitable lactams include, for example, β-propiolactam, 2-pyrrolidone, 1-methyl-2-pyrrolidone (N-methylpyrrolidone), δ-valerolactam, ε-caprolactam, 1-(2-hydroxyetyl)-2-pyrrolidone, 1-ethyl-2-pyrrolidone, methyl-2-oxo-1-pyrrolidineacetate, and the like, and mixtures thereof. Particularly preferred are δ-valerolactam and pyrrolidones such as 2-pyrrolidone and 1-methyl-2-pyrrolidone.

Lactones are cyclic esters. Like the lactams, the lactones can contain ring substituents such as alkyl, hydroxyalkyl, hydroxy, halogen, or alkoxy groups, or the like. Suitable lactones include, for example, β-propiolactone, γ-butyrolactone, 67-valerolactone, ε-caprolactone, and the like, and mixtures thereof. γ-Butyrolactone is particularly preferred.

Both the $C_3-C_5$ aliphatic alcohol and the cyclic, bidentate compound are needed to give a catalyst that is highly active and also gives the desirable reduction in the amount of high-molecular-weight polyether component. If the cyclic, bidentate compound is omitted, the catalyst has high activity (like the ones disclosed in U.S. Pat. No. 5,470,813), but polyols made from the catalyst can contain undesirable levels of the high-molecular-weight component. On the other hand, if only the cyclic, bidentate compound is present as the complexing agent, the catalysts tend to have relatively low activity and/or give polyols with broad molecular weight distributions and high viscosities.

The relative amounts of $C_3-C_5$ aliphatic alcohol to cyclic, bidentate compound needed in the catalyst can vary over a wide range, and a skilled person can control catalyst activity, polyol viscosity, and the like, by varying them. However, preferred catalysts will contain from about 5 to about 95 mole percent, based on the total amount of organic complexing agent, of the cyclic, bidentate compound. More preferred are catalysts that contain from about 10 to about 80 mole percent of the cyclic, bidentate compound; most preferred is the range from about 20 to about 60 mole percent.

Catalysts of the invention optionally include a functionalized polymer or its water-soluble salt. By "functionalized polymer" we mean a polymer that contains one or more functional groups containing oxygen, nitrogen, sulfur, phosphorus, or halogen, wherein the polymer, or a water-soluble salt derived from it, has relatively good water solubility, i.e., at least about 3 wt. % of the polymer or its salt dissolves at room temperature in water or mixtures of water with a water-miscible organic solvent. Examples of water-miscible organic solvents are tetrahydrofuran, acetone, acetonitrile, t-butyl alcohol, and the like. Water solubility is important for incorporating the functionalized polymer, when used, into the catalyst structure during formation and precipitation of the double metal cyanide compound.

Polyethers are preferred functionalized polymers. Catalysts that incorporate a polyether are taught in U.S. Pat. Nos. 5,482,908 and 5,545,601, the teachings of which are incorporated herein by reference. A particularly preferred catalyst of the invention incorporates a polyether polyol as the functionalized polymer.

Other suitable functionalized polymers include, for example, poly(acrylamide), poly(acrylic acid), poly(acrylic acid-co-maleic acid), poly(alkyl acrylate)s, poly(alkyl methacrylate)s, poly(vinyl methyl ether), poly(vinyl acetate), poly(vinyl alcohol), poly(N-vinylpyrrolidone), poly(N-vinylpyrrolidone-co-acrylic acid), poly(N,N-dimethylacrylamide), poly(4-vinylpyridine), poly(vinyl chloride), poly(acrylic acid-co-styrene), poly(vinyl sulfate), poly(vinyl sulfate) sodium salt, and the like. Many other suitable functionalized polymers are described in U.S. Pat. No. 5,714,428, the teachings of which are incorporated herein by reference.

The functionalized polymer, when used, comprises from about 2 to about 80 wt. % of the catalyst. Preferably, the catalyst contains from about 5 to about 70 wt. % of the functionalized polymer; most preferred is the range from about 10 to about 60 wt. %.

Catalysts of the invention are preferably substantially non-crystalline. By "substantially non-crystalline," we mean lacking a well-defined crystal structure, or characterized by the substantial absence of sharp lines in the powder X-ray diffraction pattern of the composition. Conventional zinc hexacyanocobaltate-glyme catalysts (such as those described in U.S. Pat. No. 5,158,922) show a powder X-ray diffraction pattern containing many sharp lines, which indicates that the catalyst has a high degree of crystallinity. Zinc hexacyanocobaltate prepared in the absence of a complexing agent is also highly crystalline (and is inactive for epoxide polymerization). In contrast, catalysts of the invention are preferably substantially non-crystalline.

Catalysts of the invention also feature unique infrared spectra. Many prior DMC catalysts, particularly the highly active, substantially non-crystalline varieties, exhibit absorption bands for free Zn—OH vibrations at 3650 $cm^{-1}$ and 642 $cm^{-1}$. In contrast, preferred catalysts of the invention lack these bands or have reduced absobances at these wavenumbers. These observations are significant because the lack of infrared absorption bands from free Zn—OH appears to correlate well with reduced formation of high-molecular-weight polyol components (see Examples 1, 2, 4, and C10; Tables 1 and 2). In addition, catalysts of the invention uniquely show a low-energy carbonyl absorption (e.g., about 1630 $cm^{-1}$ for 2-pyrrolidones), which suggests the presence of a stable complex of the cyclic, bidentate compound and the DMC catalyst.

The invention includes a method for making the catalysts. The method comprises reacting, preferably at a temperature within the range of about room temperature to about 80° C., aqueous solutions of a metal salt (usually used in excess) and a metal cyanide salt in the presence of the organic complexing agent and optional functionalized polymer. The organic complexing agent components are included with either or both of the aqueous salt solutions, or they are added to the catalyst slurry immediately following precipitation of the DMC compound. It is generally preferred to pre-mix one or both of the complexing agent components with either aqueous solution, or both, before combining the reactants. The resulting catalyst is isolated (by centrifugation, filtration, decanting, or the like), washed, and dried as described previously (see, e.g., U.S. Pat. Nos. 5,470,813, 5,482,908, and 5,714,428, the teachings of which are incorporated herein by reference).

In one preferred method of the invention, the cyclic, bidentate compound is included in one or both of the aqueous reactant solutions. In other words, it is included in the aqueous metal salt (e.g., zinc chloride) solution and/or the aqueous metal cyanide salt (e.g., potassium hexacyanocobaltate) solution before the two solutions are mixed. The reactant solutions are combined using efficient mixing (preferably by homogenization or high-shear stirring, e.g.) to produce a catalyst slurry that contains the DMC compound. The catalyst is then isolated, usually by filtration under pressure, and the residue is washed with an aqueous mixture that contains the $C_3$–$C_5$ aliphatic alcohol. Optionally, this washing mixture also includes a functionalized polymer. The catalyst is then isolated as before, and additional washings with the $C_3$–$C_5$ aliphatic alcohol or aqueous mixtures containing the alcohol and/or functionalized polymer are used. Preferably, the final wash uses no water.

The method of the invention offers some valuable and unexpected benefits for catalyst manufacture that result from using a cyclic, bidentate compound. First, DMC catalysts made in the presence of the cyclic, bidentate compound are easier to filter than prior DMC catalysts, so the total amount of time needed to make them is reduced (see Example 15 and Comparative Example 16). Second, the cyclic, bidentate compound acts as a defoamer in the catalyst preparation, so less catalyst is deposited on the walls of the reactor used for catalyst manufacture. This results in improved catalyst consistency and less wasted catalyst.

The invention includes a process for making an epoxide polymer. This process comprises polymerizing an epoxide in the presence of a DMC catalyst of the invention. Preferred epoxides are ethylene oxide, propylene oxide, butene oxides, styrene oxide, and the like, and mixtures thereof. The process can be used to make random or block copolymers. The epoxide polymer can be, for example, a polyether polyol derived from the polymerization of an epoxide in the presence of a hydroxyl group-containing initiator.

Other monomers that will copolymerize with an epoxide in the presence of a DMC compound can be included in the process of the invention to make other types of epoxide polymers. Any of the copolymers known in the art made using conventional DMC catalysts can be made with the catalysts of the invention. For example, epoxides copolymerize with oxetanes (as taught in U.S. Pat. Nos. 3,278,457 and 3,404,109) to give polyethers, or with anhydrides (as taught in U.S. Pat. Nos. 5,145,883 and 3,538,043) to give polyester or polyetherester polyols. The preparation of polyether, polyester, and polyetherester polyols using DMC catalysts is fully described, for example, in U.S. Pat. Nos. 5,223,583, 5,145,883, 4,472,560, 3,941,849, 3,900,518, 3,538,043, 3,404,109, 3,278,458, 3,278,457, and in J. L. Schuchardt and S. D. Harper, SPI Proceedings, 32nd Annual Polyurethane Tech./Market. Conf. (1989) 360. The teachings of these U.S. patents related to polyol synthesis using DMC catalysts are incorporated herein by reference in their entirety.

Polyether polyols (or monols) made with the catalysts of the invention preferably have average hydroxyl functionalities from about 1 to 8, more preferably from about 2 to 6, and most preferably from about 2 to 3. The polyols preferably have number average molecular weights (Mn) within the range of about 500 to about 50,000. A more preferred range is from about 1,000 to about 12,000; most preferred is the range from about 2,000 to about 8,000.

The invention offers unexpected benefits for polyols. In particular, polyols made using DMC catalysts of the invention contain reduced levels of high-molecular-weight components compared with similar catalysts prepared without a cyclic, bidentate compound. The amount of high-molecular-weight component is quantified by any suitable method. A particularly convenient way to measure this component is by gel permeation chromatography (GPC). A suitable technique is described below in Example B.

Polyols made according to the invention consistently contain less than about 10 ppm of polyether components having a number average molecular weight greater than 400,000 (i.e., Mn>400K). Polyols made with most highly active DMC catalysts normally contain higher levels (at least 10 ppm) of material having Mn>400K. While this reduction in the amount of high-molecular-weight polyol component may appear trivial, we surprisingly found that polyols of the invention consistently pass the "supercritical foam test" (SCFT)—a sensitive foam test designed to reveal whether or not polyols will cause foam settling or collapse in the field—while polyols made with other highly active DMC catalysts did not always pass the same test. Example A below explains how to practice the SCFT.

The following examples merely illustrate the invention. Those skilled in the art will recognize many variations that are within the spirit of the invention and scope of the claims.

CATALYST PREPARATION EXAMPLES

Example 1

This example illustrates the preparation of a substantially non-crystalline zinc hexacyanocobaltate catalyst that incorporates 1-(2-hydroxyethyl)-2-pyrrolidone (HEP) as a complexing agent in addition to tert-butyl alcohol and a 1000 mol. wt. polyether diol.

Aqueous zinc chloride solution (120 g of 62.5 wt. % $ZnCl_2$) is diluted with deionized water (230 g) and HEP (50 mL) in a one-liter beaker (Solution 1). Potassium hexacyanocobaltate (7.5 g) is dissolved in a second beaker with deionized water (100 mL) and HEP (20 mL) (Solution 2). Solution 3 is prepared by dissolving a 1000 mol. wt. polyoxypropylene diol (8.0 g) in deionized water (50 mL) and tetrahydrofuran (THF) (2 mL). Solution 2 is added to Solution 1 over 35 min. while homogenizing at 20% of maximum intensity. Following the addition, homogenization continues at 40% intensity for 10 min. The homogenizer is stopped. Solution 3 is added, followed by slow stirring for 3 min.

The reaction mixture is filtered at 40 psig through a 20 $\mu$m nylon membrane. The catalyst cake is reslurried in a mixture of tert-butyl alcohol (130 mL) and deionized water (55 mL), and is homogenized at 40% intensity for 10 min. The homogenizer is stopped. More 1000 mol. wt. polyoxypropylene diol (2.0 g) dissolved in THF (2 g) is added, and the mixture is stirred slowly for 3 min. The catalyst is isolated as described above. The cake is reslurried in tert-butyl alcohol (185 mL) and homogenized as described above. More 1000 mol. wt. diol (1.0 g) in THF (2 g) is added, and the product is isolated in the usual way. The resulting catalyst residue dried in a vacuum oven at 60° C., 30 in. (Hg) to constant weight.

Example 2

The procedure of Example 1 is followed, except that a 50/50 mixture of N-methyl-2-pyrrolidone and tert-butyl alcohol replaces HEP in reactant Solutions 1 and 2.

Example 3

The procedure of Example 1 is followed, except that a 25/75 mixture of N-methyl-2-pyrrolidone and tert-butyl alcohol replaces HEP in reactant Solutions 1 and 2.

Example 4

The procedure of Example 1 is followed, except that poly(vinyl pyrrolidone) is used instead of the 1000 mol. wt. polyoxypropylene diol.

Example 5

The procedure of Example 1 is followed, except that a 50/50 mixture of 2-pyrrolidone and tert-butyl alcohol replaces HEP in reactant Solutions 1 and 2.

Example 6

The procedure of Example 1 is followed, except that a 25/75 mixture of 2-pyrrolidone and tert-butyl alcohol replaces HEP in reactant Solutions 1 and 2.

Example 7

The procedure of Example 1 is followed, except that a 10/90 mixture of γ-butyrolactone and tert-butyl alcohol replaces HEP in reactant Solutions 1 and 2.

Example 8

The procedure of Example 1 is followed, except that a 25/75 mixture of γ-butyrolactone and tert-butyl alcohol replaces HEP in reactant Solutions 1 and 2.

Example 9

The procedure of Example 1 is followed, except that δ-valerolactam (40 g in Solution 1, 10 g in Solution 2) replaces HEP.

Comparative Example 10

The procedure of Example 1 is followed, except tert-butyl alcohol replaces all of the HEP used. This catalyst is prepared essentially by the method of U.S. Pat. No. 5,482,908.

As Examples 1–9 and Comparative Example 10 show (see Table 2), including a cyclic, bidentate compound in the preparation of a substantially non-crystalline double metal cyanide catalyst offers unexpected benefits. In particular, polyols made using the catalysts contain reduced levels of high-molecular-weight (>400,000 mol. wt.) polyol component. In addition, the polyols perform better than the control polyols (ones made using a catalyst not prepared in the presence of a cyclic, bidentate compound) in the supercritical foam test, i.e., they exhibit a reduced level of settling compared with prior DMC-catalyzed polyols.

Example 11

This example illustrates the preparation of a substantially non-crystalline zinc hexacyanocobaltate catalyst that incorporates 1-(2-hydroxyethyl)-2-pyrrolidone (HEP) as a complexing agent in addition to tert-butyl alcohol (but without a polyether diol).

Aqueous zinc chloride solution (120 g of 62.5 wt. % $ZnCl_2$) is diluted with deionized water (230 g) and HEP (50 mL) in a one-liter beaker (Solution 1). Potassium hexacyanocobaltate (7.5 g) is dissolved in a second beaker with deionized water (100 mL) and HEP (20 mL) (Solution 2). Solution 2 is added to Solution 1 over 40 min. while homogenizing at 20% of maximum intensity. Following the addition, homogenization continues at 40% intensity for 10 min.

The reaction mixture is filtered at 40 psig through a 20 $\mu$m nylon membrane. The catalyst cake is reslurried in a mixture of tert-butyl alcohol (130 mL) and deionized water (55 mL), and is homogenized at 40% intensity for 10 min. The catalyst is isolated as described above. The cake is reslurried in tert-butyl alcohol (185 mL) and homogenized as described above. The catalyst is isolated as described above, and is dried in a vacuum oven at 60° C., 30 in (Hg) to constant weight.

Example 12

The procedure of Example 11 is followed, except that 2-pyrrolidone replaces HEP in reactant Solutions 1 and 2.

Comparative Example 13

The procedure of U.S. Pat. No. 5,470,813 (Example 1) is used to prepare the catalyst. The complexing agent is tert-butyl alcohol only, and no polyether is included.

As Examples 11–12 and Comparative Example 13 (see Table 3) show, the benefits of the invention are not limited to catalysts made in the presence of a functionalized polymer. In particular, polyols made using the catalysts of the invention contain reduced levels of high-molecular-weight (>400,000 mol. wt.) polyol component and perform better than the control polyols in the supercritical foam test.

Evaluation of Catalysts: Polyol Systhesis

Example 14

General procedure: Typical "slab" polyoxypropylene triols are prepared by adding propylene oxide over 2 hours to an activated mixture containing the zinc hexacyanocobaltate catalyst and a propoxylated glycerin starter (hydroxyl number=240 mg KOH/g). Catalyst levels of 30–100 ppm (see Tables 2 and 3) are used. The hydroxyl number, viscosity, and polydispersity (by GPC) of each product is measured by standard methods. A GPC technique (see Example B) is used to measure the amount of polyol component having a number average molecular weight (Mn) greater than about 400,000, and the amount present (in ppm) is recorded in Tables 2 and 3. "N.D." means "none detected."

Each polyol is also evaluated in the "supercritical foam test" (SCFT), which is described below in Example A. Each polyol's performance is compared against the performance of a KOH-based polyol (3000 mol. wt. polyoxypropylene triol) in the same test. The % settling of both samples is measured. The ratio of the % settle in the foam made using the KOH standard to the % settle in the foam made using the polyol to be tested is calculated. A ratio in the SCFT test of 0.6 or greater is deemed a "pass," while a ratio less than 0.6 fails. A ratio of 1.0 means that the tested polyol performs as well as a KOH-based polyol in the test; a ratio greater than 1 indicates that the sample outperforms (a "high pass") the KOH-based standard. For example, if the KOH-based polyol shows a % settle of 11%, and the tested polyol shows a % settle of 31%, the tested polyol has a KOH/sample ratio of 11/31=0.35, which fails the test.

Example A

Supercritical Foam Test (SCFT)

Conventional one-shot flexible polyurethane foams are hand mixed and poured using the following "stressed" formulation. The formulation is characterized as stressed because it is intentionally made sensitive to the presence of high-molecular-weight polyol component.

The B-side is prepared from the polyol sample to be analyzed (100 parts, typically a 3000 mol. wt. polyether triol), water (6.5 parts), dichloromethane (15 parts), A-1 catalyst (product of Witco, 0.1 parts), T-9 catalyst (product of Air Products, 0.25 parts), and L-550 surfactant (product of Witco, 0.5 parts). Toluene diisocyanate (78.01 parts, 110 NCO/OH index) is rapidly added to the B-side components, the ingredients are mixed well and poured into a cake box. The foam rises and cures, and the % settling (or collapse) is noted.

Example B

Measurement of High Molecular Weight Polyol Component by Gel Permeation Chromatography (GPC)

The molecular weight of the high molecular weight component of the polyol samples is quantified by comparing elution times in a GPC column with that of polystyrene samples of known molecular weights. The fraction of the sample having a number average molecular weight (Mn) greater than 400,000 is then determined by standard methods.

A Jordi Gel DVB $10^3$ angstrom column, 10×250 mm, 5 micron particle size, is employed with a mobile phase which consists of tetrahydrofuran. The detector is a Varex Model IIA evaporative light scanning detector. Polystyrene stock solutions are made from polystyrenes of different molecular weights by dilution with tetrahydrofuran to form standards containing 2, 5, and 10 mg/L of polystyrene. Samples are prepared by weighing 0.1 g of polyether polyol into a one-ounce bottle and adding tetrahydrofuran to the sample to adjust the total weight of the sample and solvent to 10.0 g. Samples of the calibration solutions are sequentially injected into the GPC column. Duplicates of each polyether polyol sample are then injected, followed by a reinjection of the various polystyrene standards. The peak areas for the standards are electronically integrated, and the electronically integrated peaks for the two sets of each candidate polyol are electronically integrated and averaged. For each sample, the fraction of material having Mn>400,000 is calculated and reported.

Example 15 and Comparative Example 16

The procedure of Example 1 is generally followed, except that the times for each filtration step (see last paragraph of Example 1) are noted. The filtration times: first filtration: 4 min.; second: 6 min.; third: 4 min.

For comparison, the filtration times are also noted in making a catalyst by the procedure of Comparative Example 10. The filtration times noted: first filtration: 17 min.; second: 32 min.; third: 4 min.

The results demonstrate that catalysts made in the presence of a cyclic, bidentate compound are much easier to filter compared with prior DMC catalysts, so they will require less time to prepare them.

The preceding examples merely illustrate the invention; the following claims define the scope of the invention.

TABLE 1

Catalyst Characterization

| Ex # | Infrared spectrum Absorbance, 642 cm$^{-1}$ | Complexing agents (mole %)[1] tert-butyl alcohol | HEP | NMP | Functionalized Polymer |
|---|---|---|---|---|---|
| 1 | 0 | 82 | 18 | 0 | 1K poly(PO) diol |
| 2 | 0 | 53 | 0 | 47 | 1K poly(PO) diol |
| 4 | 0 | 33 | 67 | 0 | PVP |
| C10 | 0.225 | 100 | 0 | 0 | 1K poly(PO) diol |

HEP = 1-(2-hydroxyethyl)-2-pyrrolidone; NMP = N-methyl-2-pyrrolidone; PVP = poly(vinyl pyrrolidone)
[1]Based on the total amount of t-butyl alcohol + the cyclic, bidentate compound.

TABLE 2

Effect of Catalyst on Polyol Performance

| Catalyst ex. # | 1 | 2 | 3 | 4 | 5 | 6 | 7 | 8 | 9 | C10 |
|---|---|---|---|---|---|---|---|---|---|---|
| Other complex. agent (with t-butyl alcohol) | HEP | 50% NMP | 25% NMP | HEP | 50% PYR | 25% PYR | 10% GBL | 25% GBL | VL | none |
| Functionalized polymer | 1K diol | 1K diol | 1K diol | PVP | 1K diol | 1K diol | 1K diol | 1K diol | 1K diol | 1K diol |
| ppm catalyst | 50 | 100 | 100 | 100 | 50 | 50 | 30 | 30 | 50 | 30 |
| Polyol properties | | | | | | | | | | |
| Mw/Mn | 1.09 | 1.07 | 1.06 | 1.08 | 1.09 | 1.03 | 1.21 | 1.24 | 1.12 | 1.03 |
| OH # (mg KOH/g) | 56.8 | 56.9 | 56.3 | 56.8 | 55.6 | 55.1 | 56.1 | 55.7 | 57.3 | 56.2 |
| Viscosity (cps) | 580 | 550 | 582 | 603 | 562 | 550 | 574 | 574 | 592 | 566 |
| >400K mol. wt. (ppm) | N.D. | N.D. | N.D. | N.D. | N.D. | 6 | N.D. | N.D. | N.D. | 10 |
| SCFT: KOH/sample | 0.83 | 1.25 | 0.60 | 0.74 | 1.03 | 0.64 | 0.81 | 0.71 | 0.99 | 0.36 |
| Pass/Fail | pass | high pass | low pass | pass | pass | low pass | pass | pass | pass | fail |

HEP = 1-(2-hydroxyethyl)-2-pyrrolidone; NMP = N-methyl-2-pyrrolidone; PYR = 2-pyrrolidone; GBL = γ-butyrolactone; PVP = poly(vinyl pyrrolidone); VL = δ-valerolactam. High molecular weight polyol component (by GPC) is the amount of sample with Mn > 400,000; N.D. = none detected.

TABLE 3

Effect of Catalyst on Polyol Performance

| Catalyst ex. # | 11 | 12 | C13 |
|---|---|---|---|
| Other complexing agent (with t-butyl alcohol) | HEP | PYR | none |
| Functionalized polymer | none | none | none |
| ppm catalyst | 50 | 50 | 50 |
| Polyol properties | | | |
| Mw/Mn | 1.11 | 1.14 | 1.04 |
| OH # (mg KOH/g) | 57.8 | 57.8 | 56.5 |
| Viscosity (cps) | 591 | 616 | 567 |
| >400K mol. wt. (ppm) | N.D. | N.D. | 23 |
| SCFT results: KOH/sample | 0.67 | 1.0 | 0.28 |
| Pass/Fail | pass | pass | fail |

HEP = 1-(2-hydroxyethyl)-2-pyrrolidone; PYR = 2-pyrrolidone. High-molecular-weight polyol component (by GPC) is the amount of sample with Mn > 400,000; N.D. = none detected.

We claim:

1. A catalyst which comprises:
   (a) a double metal cyanide (DMC) compound;
   (b) an organic complexing agent comprising a $C_3$–$C_5$ aliphatic alcohol and from about 5 to about 95 mole %, based on the total amount of organic complexing agent, of a cyclic, bidentate compound selected from the group consisting of lactams and lactones; and
   (c) optionally, from about 2 to about 80 wt. % of a functionalized polymer.

2. The catalyst of claim 1 wherein the DMC compound is a zinc hexacyanocobaltate.

3. The catalyst of claim 1 wherein the $C_3$–$C_5$ aliphatic alcohol is tert-butyl alcohol.

4. The catalyst of claim 1 wherein the cyclic, bidentate compound is selected from the group consisting of γ-butyrolactone, N-methyl-2-pyrrolidone, 2-pyrrolidone, 1-ethyl-2-pyrrolidone, δ-valerolactam, ε-caprolactone, ε-caprolactam, methyl-2-oxo-1-pyrrolidineacetate, and 1-(2-hydroxyethyl)-2-pyrrolidone.

5. The catalyst of claim 1 wherein the organic complexing agent comprises from about 10 to about 80 wt. % of the cyclic, bidentate compound.

6. The catalyst of claim 1 wherein the functionalized polymer is a polyether.

7. A catalyst of claim 1 that is substantially non-crystalline by powder X-ray diffraction analysis.

8. A catalyst of claim 7 that lacks infrared absorption bands at about 3650 $cm^{-1}$ and about 642 $cm^{-1}$.

9. A process for making an epoxide polymer, said process comprising polymerizing an epoxide in the presence of a hydroxyl group-containing starter and the catalyst of claim 1.

10. A catalyst which comprises:
    (a) a zinc hexacyanocobaltate compound;
    (b) an organic complexing agent comprising tert-butyl alcohol and from about 5 to about 95 mole %, based on the total amount of organic complexing agent, of a cyclic, bidentate compound selected from the group consisting of lactams and lactones; and
    (c) optionally, from about 5 to about 70 wt. % of a functionalized polymer.

11. The catalyst of claim 10 wherein the cyclic, bidentate compound is selected from the group consisting of γ-butyrolactone, N-methyl-2-pyrrolidone, 2-pyrrolidone, 1-ethyl-2-pyrrolidone, 67 -valerolactam, ε-caprolactone, ε-caprolactam, methyl-2-oxo-1-pyrrolidineacetate, and 1-(2-hydroxyethyl)-2-pyrrolidone.

12. The catalyst of claim 10 wherein the organic complexing agent comprises from about 10 to about 80 wt. % of the cyclic, bidentate compound.

13. The catalyst of claim 10 wherein the functionalized polymer is a polyether.

14. A catalyst of claim 10 that is substantially non-crystalline by powder X-ray diffraction analysis.

15. A catalyst of claim 14 that lacks infrared absorption bands at about 3650 $cm^{-1}$ and about 642 $cm^{-1}$.

16. A process for making an epoxide polymer, said process comprising polymerizing an epoxide in the presence of a hydroxyl group-containing starter and the catalyst of claim 10.

17. A method which comprises reacting aqueous solutions of a metal salt and a metal cyanide salt in the presence of an organic complexing agent and optionally, from about 2 to about 80 wt. % of a functionalized polymer, to produce a double metal cyanide (DMC) catalyst;
    wherein the organic complexing agent comprises a $C_3$–$C_5$ aliphatic alcohol and from about 5 to about 95 mole %, based on the total amount of organic complexing agent, of a cyclic, bidentate compound selected from the group consisting of lactams and lactones.

18. The method of claim 17 wherein the functionalized polymer is a polyether.

19. The method of claim 17 wherein the cyclic, bidentate compound is selected from the group consisting of γ-butyrolactone, N-methyl-2-pyrrolidone, 2-pyrrolidone, 1-ethyl-2-pyrrolidone, δ-valerolactam, ε-caprolactone, ε-caprolactam, methyl-2-oxo-1- pyrrolidineacetate, and 1-(2-hydroxyethyl)-2-pyrrolidone.

20. The method of claim 17 wherein the DMC catalyst is a substantially non-crystalline zinc hexacyanocobaltate.

21. The method of claim 17 wherein the $C_3$–$C_5$ aliphatic alcohol is tert-butyl alcohol.

* * * * *